Oct. 13, 1936.  J. H. LOEB  2,057,387
PRESSURE RESPONSIVE SWITCH OPERATOR
Filed Jan. 15, 1935
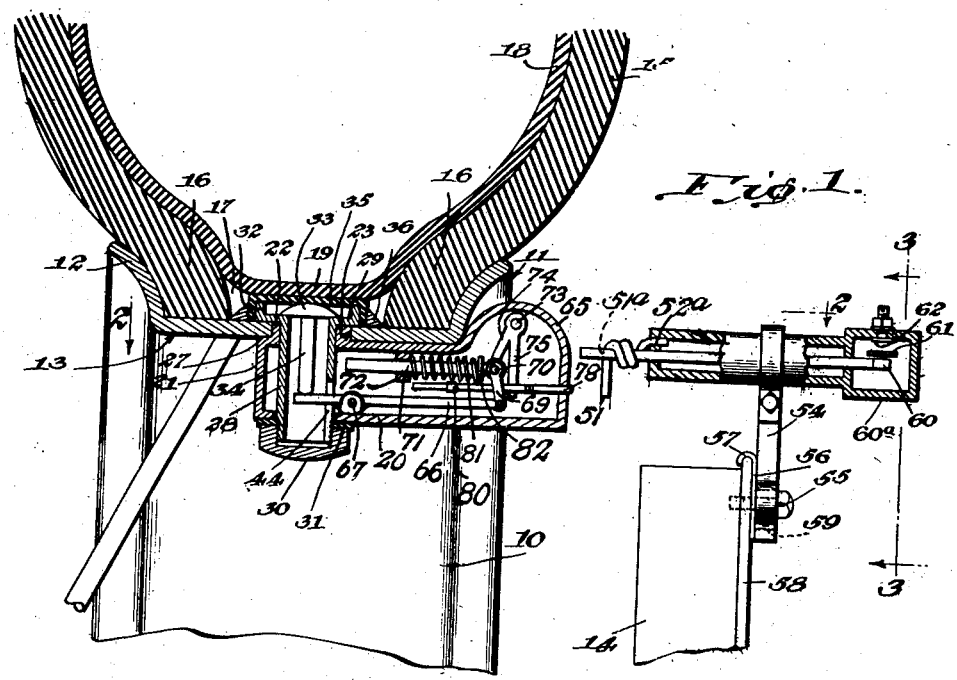
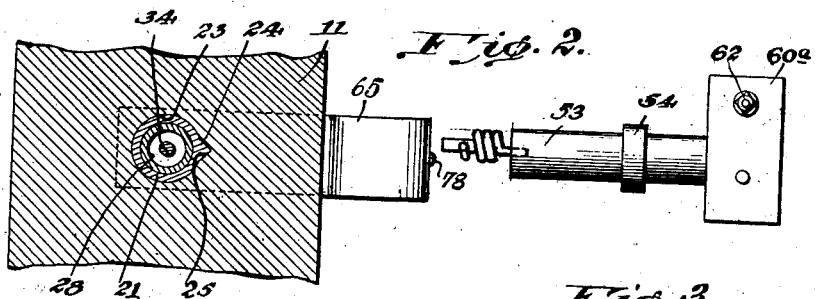
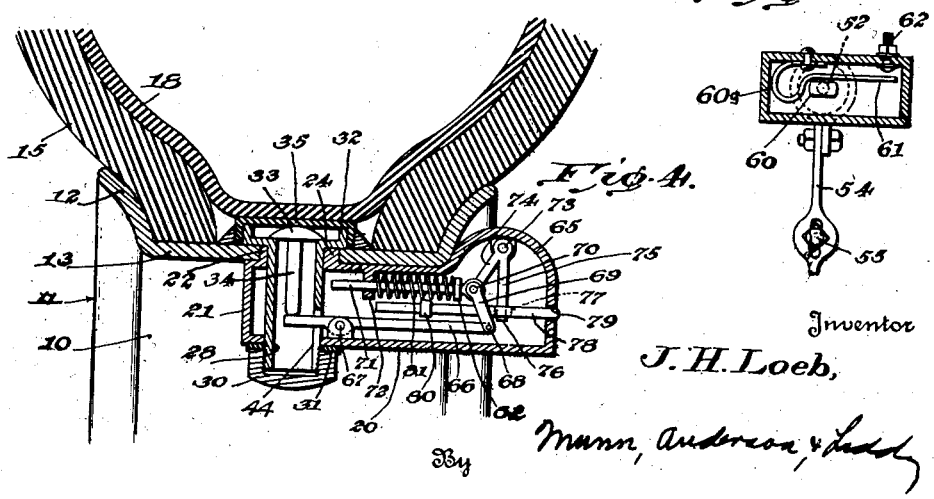
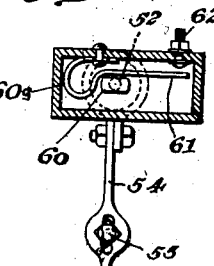
Inventor
J. H. Loeb,
By Mann, Anderson & Ladd
Attorneys Patented Oct. 13, 1936

2,057,387

UNITED STATES PATENT OFFICE 2,057,387

PRESSURE RESPONSIVE SWITCH OPERATOR

Joseph H. Loeb, Morgan City, La.

Application January 15, 1935, Serial No. 1,943

1 Claim. (Cl. 200—58)

This invention relates to a pressure responsive switch operator in a signalling device for pneumatic tires.

An object of the invention is the provision of a switch operating mechanism for a signalling device for indicating to a driver that a low pressure exists in a pneumatic tire of the vehicle so that the operator of the vehicle may take the necessary steps to correct whatever condition exists in the tire that is causing the low pressure.

Another object of the invention is the provision of a switch operating mechanism for closing an electric circuit to cause audible or visible signals, the circuit being closed automatically and periodically through the intermediary of a plunger or rod which is projected into the path of a switch-operated mechanism, said plunger or rod being released to an operative position when the air pressure in the tire has been decreased to a predetermined degree.

A further object of the invention is the provision of switch operating mechanism for a signalling device for pneumatic tires which is simple, efficient and readily applicable to a rim of a vehicle wheel the device being adapted for attachment to the rim without necessitating any changes in the construction of the wheel or rim.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claim.

In the drawing:

Figure 1 is a fragmentary vertical section of a wheel and of the switch operating mechanism shown in operative relation with a switch.

Figure 2 is a horizontal section taken along the line 2—2 of Figure 1,

Figure 3 is a vertical section taken along the line 3—3 of Figure 1, and

Figure 4 is a vertical section of the switch operating mechanism with the switch removed.

Referring more particularly to the drawing, 10 designates a vehicle wheel having a rim 11 which consists of a pair of outwardly flared flanges 12 and a base member 13 located inwardly of the peripheries of the flanges 12 whereby an annular channel is formed in the rim. A brake drum 14 of the usual type is associated with the wheel 10.

A casing 15 has its free edges 16 located within the annular channel 17 of the rim 11. An inner tube 18 is located within the casing 15 and has one portion 19 when inflated forced between the free edges or beads 16 of the casing 15 and in contact with the base member 13 of the rim 11.

A casing 20 which may be of any configuration in cross section extends transversely of the rim 11 and is normally disposed in a horizontal position. This casing has an extension 21 formed integrally with the casing 20 and is provided with a reduced portion 22 received within an opening 23 formed in the rim 11 in order to prevent rotation of the casing 20 and its extension 21 in the opening 23. The extension is provided with a web 24 received within a complementarily formed groove 25 extending laterally from the opening 23. The reduced portion 22 of the extension 21 provides a shoulder 27 which engages the inner face of the base member 13.

A tubular member 28 neatly fits within the extension 21 and is provided with a flange 29 resting upon the outer edge of the reduced portion 22 and the outer face of the base member 13. The inner end of the tubular member is threaded to receive a cap nut 30. A washer 31 is located between the cap nut and the inner portion of the extension and the casing 20. The cap nut in connection with the flange 29 not only secures the tubular member 28 in place but likewise the casing 20 and its integrally formed extension 21. The tubular member 28 is provided with an upstanding annular flange 32 projecting from the flange 29 to provide a pocket to receive a head 33 of a pin 34 which is disposed centrally of the tubular member 28.

A diaphragm 35, which may be formed of leather or any other suitable substance, is stretched across the outer end of the upstanding flange 32 and has its side walls secured to the flange by means of a split ring 36. The inner tube 18 when inflated presses inwardly upon the diaphragm 35 for maintaining the head 33 of the pin 34 upon the lateral flange 29.

Projecting into the path of the outer end of the plunger 79 which will be presently described, is a spring arm 51 which passes through a perforation 51ª in a rock shaft 52 mounted in a casing 53 carried by a bracket 54 which is adjustably secured by means of a bolt 55 to the brake drum 14. The spring arm, as shown at 52ª is secured to the casing 53. A washer 56 is located between the lower end of the bracket 54 and the drum 14 and is provided with ears 57 to engage over the beaded edge 58 of the drum 14. A bolt 55

55, passing through an elongated slot 59 at the lower end of the bracket 54, permits adjustment of the bracket towards and away from the center of the vehicle wheel and also permits the bracket to be revolved on the bolt to properly position the arm 51 in the path of the free end of the plunger 78 when the wheel is revolved.

A cam 60 is located on the outer end of the rock shaft 52 and is adapted to engage a spring contact member 61 which forces said spring contact member into a stationary contact 62. Wires (not shown) lead from the stationary contact 62 and the movable contact 61 to a light on the dash (not shown) which will be periodically illuminated as will be presently explained.

The casing 20 has an enlargement 65 adjacent the free end of the rod 52. A lever 66 is pivotally mounted at 67 within the casing 20 and has one end connected at 68 to a lever 69 which is pivotally connected at 70 to the outer end of a slidably mounted rod 71 which has a bearing in a bracket 72 formed integrally with the casing 20. The rod 66 projects through the slot 44 and the free end is disposed within the tubular member 28.

A bell crank, pivoted at 73 on the casing 20, has a short arm 74 pivotally connected at 70 with the reciprocating rod 71. A long arm 75 of the bell crank has an end 76 passing through an elongated opening 77 formed in a plunger or rod 78 which projects through an opening 79 in one end of the casing 20. This rod has its inner end mounted in a bracket 80 and in connection with the walls of the openings 79 provides bearings for said plunger. A coil spring 81 embraces the rod 71 and has one end in engagement with the bracket 72 and the other end in engagement with a collar 82 fixed on the rod 71 adjacent the pivotal point 70.

The operation of the device shown in Figs. 1 to 3, inclusive, is as follows: It will be noted that all of the parts are so constructed that the device may be readily assembled and attached to the rim 11 of the vehicle wheel with facility. The only change in the rim necessary to apply the device is to provide the opening 23 for the insertion of the reduced end 22 of the extension 21. After the extension 21 and the casing 20 have been applied to the rim the tubular member 28 is inserted into the extension 21 from the exterior of the rim and the cap nut 30 rigidly secures the parts in place. It will be noted that the slot 44 and the tubular member extends entirely through the inner end of the tubular member 28 so that the lever 66 may be readily inserted through the bottom from the inner end of said tubular member.

In Figures 1 and 4 the parts are shown in position with the inner tube 18 inflated and the device is then in an inoperative position with the inner tube pressing upon the diaphragm 35 for maintaining the inner end of the pin 34 in engagement with the inner end of the lever 66 so that the rod 78 will be in a retracted position against the tension of the spring 81.

When the inner tube 18 loses air and becomes sufficiently deflated the pressure against the diaphragm 35 will not be sufficient to overcome the tension of the spring 81. Therefore, the plunger 78 will be moved outwardly by the spring 81 acting on the collar 82 for forcing the rod 71 outwardly and thereby oscillating the arms 74 or the bell crank so that the arm 75 is oscillated which moves in the slot 77 causing the plunger 78 to be moved outwardly into the path of the spring arm 51.

The lever 66 has its outer end moved downwardly while the inner end which is within the casing 28 will be moved upwardly, raising the pin 34.

With the plunger 77 disposed in an outward position it will engage the spring arm 51 causing rocking of the member 52 periodically with a periodic closing of the alarm to notify the operator of the car that the tire is being deflated.

After the tire has been fixed and the proper pressure has been placed in the tire, the pin 34 will be forced inwardly against the inner end of the lever 66, thereby raising the outer end of the lever and causing the link 69 to move the rod 71 inwardly against the tension of the spring, whereby the bell crank will move the plunger 78 inwardly and out of the path of the spring arm 71.

I claim:

An operating mechanism for tire signalling devices comprising a barrel carried by the rim of a pneumatic tire, a casing connected to the barrel, a lever pivotally mounted in the casing and projecting into the barrel, a plunger in the barrel and acted on by a predetermined pressure in the tire for retaining the plunger in operative relation with the lever, a rod slidably mounted in the casing and having an end adapted to be projected beyond the casing for causing operation of a circuit breaker, an auxiliary rod slidable in the casing, a spring urging the auxiliary rod in the direction of movement of the first rod, a link pivotally connecting the outer end of the auxiliary rod with the lever, a bell-crank pivoted in the casing and having an arm pivoted to the outer end of the auxiliary rod, the other arm of the bell-crank having operative connections with the first rod so that when the lever is released the spring will urge both rods outwardly.

JOS. H. LOEB.